United States Patent

Kim

Patent Number: 5,931,379
Date of Patent: Aug. 3, 1999

[54] METHOD AND APPARATUS FOR CONTROLLING A BI-DIRECTIONAL PUMP OF A GAS BOILER

[75] Inventor: Yong-Bum Kim, Incheon, Rep. of Korea

[73] Assignee: Daewoo Electronics K.K., Seoul, Rep. of Korea

[21] Appl. No.: 09/041,947

[22] Filed: Mar. 13, 1998

[30] Foreign Application Priority Data

Mar. 28, 1997 [KR] Rep. of Korea ....................... 97-11086
Mar. 28, 1997 [KR] Rep. of Korea ....................... 97-11089

[51] Int. Cl.$^6$ ..................................................... F24D 3/00
[52] U.S. Cl. ............................................. 237/8 A; 237/19
[58] Field of Search ..................... 237/19, 8 A; 417/44.1

[56] References Cited

U.S. PATENT DOCUMENTS

| | | | |
|---|---|---|---|
| 5,248,085 | 9/1993 | Jensen et al. ............................. | 237/19 |
| 5,366,153 | 11/1994 | Swenson ................................... | 237/19 |
| 5,692,676 | 12/1997 | Walker ..................................... | 237/8 R |

*Primary Examiner*—Henry Bennett
*Assistant Examiner*—Derek Boles
*Attorney, Agent, or Firm*—Pillsbury Madison & Sutro LLP

[57] ABSTRACT

Disclosed is a an apparatus for controlling a bi-directional pump of a gas boiler in which a shock noise generated when a rest or hot-water mode is switched to a heating mode, or when the heating mode is switched to the hot-water mode, during an operation of the gas boiler, is not produced. A bi-directional pump motor drives a bi-directional pump based on the selection of the heating or hot-water mode. A switching section selects a positive or reverse revolution of the bi-directional pump motor. A power control section controls an electric power supplied to the bi-directional pump motor via the switching section. When a rest or hot-water mode is selected while performing the heating mode, a control section cuts off the power supplied to the bi-directional pump motor via the power control section, and controls the switching section to be switched over to a motor reverse revolution switching terminal. Then, while increasing the power supplied to the bi-directional pump motor by degrees for a first time interval via the power control section, the control section operates the hot-water mode. When the heating mode is selected while performing the hot-water mode, the control section decreases the power supplied to the bi-directional pump motor via the power control section by degrees for a second time interval, and cuts off the supplied power. Thereafter, the control section controls the switching section to be switched over to a motor positive revolution switching terminal, and supplies the power to the bi-directional pump motor via the power control section. As a result, the gas boiler can operate in quiet.

5 Claims, 5 Drawing Sheets

A HOT-WATER MODE
(A REVERSE REVOLUTION)

A HEATING MODE
(A POSITIVE REVOLUTION)

FIG. 7
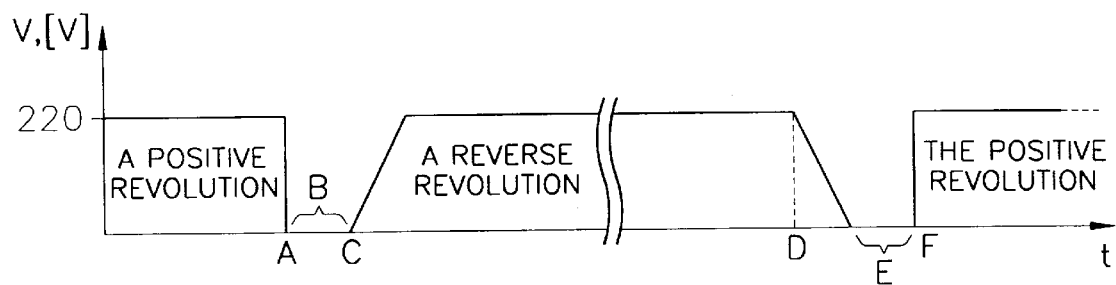
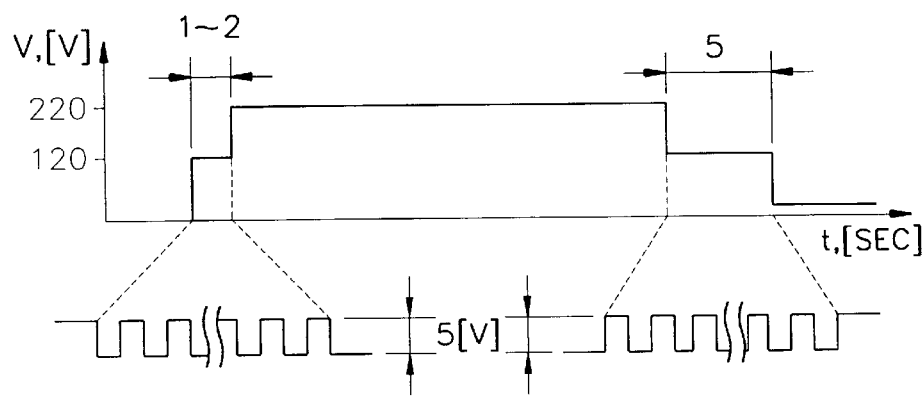
FIG. 8
FIG. 9
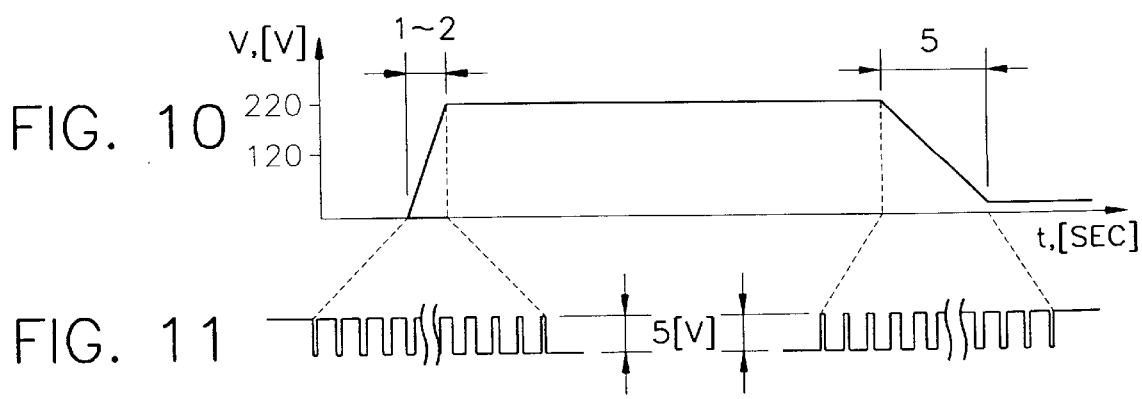
FIG. 10
FIG. 11

METHOD AND APPARATUS FOR CONTROLLING A BI-DIRECTIONAL PUMP OF A GAS BOILER

BACKGROUND OF THE INVENTION

1. Field of the Invention

The present invention relates to a method and an apparatus for controlling a bi-directional pump of a gas boiler in which a shock noise generated when the bi-directional pump is switched from a rest mode or a hot-water mode to a heating mode, is not produced to enable the gas boiler to operate in quiet.

2. Description of the Prior Art

Generally, a gas boiler heats water by using the heat which is generated while the gas is burning in a burner, and then heated water circulates through a heating pipe installed in a room to heat the room. Also, the gas boiler supplies a user with hot water when the user wants to utilize the hot water.

Namely, the gas boiler adopts a bi-directional pump which includes an inflow opening into which heated water flows, two outflow openings from which the water flowing into the inflow opening flows out along water flow paths selected by the user, and a switching ball which controls the water flow paths.

After the water which is heated depending on the mode selected by the user flows through one of the pipe conduits of the bi-directional pump, the heated water flows out from the pipe conduit to heat the inside of the room. Or the heated water flows out from another pipe conduit to supply the user with the hot water.

FIG. 1 is a configuration diagram for showing a schematic configuration of a conventional gas boiler which adopts a bi-directional pump.

As shown in FIG. 1, a gas boiler includes a gas inflow pipe 11, a gas valve 12, a burner 13, a flue 14 and an exhaust fan 15.

Gas valve 12 is installed inside of gas inflow pipe 11 into which external gas flows, and adjusts the pressure of the gas which is supplied to burner 13. Burner 13 mixes the gas flowing into gas inflow pipe 11 with air, and burns the mixed gas. A flue 14 discharges a burned exhaust gas, and exhaust fan 15 forces flue 14 to discharge the exhaust gas the moment exhaust fan 15 sucks in air to supply the air to burner 13.

Also, the gas boiler includes a heating water withdrawal pipe 16, a water tank 17, a bi-directional pump 18, an heat exchanger 19, a heating water supply pipe 20, a water supplemental-pipe 21, a supplemental-water valve 22, a tap water supply pipe 23, a hot-water supply pipe 24 and a flow switch 25.

Heating water withdrawal pipe 16 withdraws heating water from a heating pipe laying inside of a room (not shown) which executes the heating. Water tank 17 is installed in connection with heating water withdrawal pipe 16, and temporarily stores returning heating water. Bi-directional pump 18 circulates the heating water. Heat exchanger 19 heats water to heat the inside of a room. Heating water supply pipe 20 supplies heated water to a heating exhaust pipe.

Water supplemental-pipe 21 discharges the heating water, and supplemental-water valve 22 is installed inside of water supplemental-pipe 21. When hot water is required to be utilized, tap water supply pipe 23 supplies heat exchanger 19 with tap water which is not subjected to heating.

Hot water supply pipe 24 discharges the water which is heated by heat exchanger 19, and flow switch 25 senses the flow of the tap water while the user is utilizing the hot water.

Hereinafter, an operation of the gas boiler having the configuration described above, is described.

Bi-directional pump 18 circulates the heating water which is withdrawn from the heating pipe arrangement of each of the rooms via heating water withdrawal pipe 16, and which is temporarily stored in water tank 17. Then, the heating water flows into heat exchanger 19. Next, after the heating water is heated while passing through heat exchanger 19 to which the heat generated by burning the gas is supplied, the heating water is supplied to the heating pipe arrangement of each of the rooms via bi-directional pump 18 and via heating water supply pipe 20.

While the user is utilizing the hot water, the tap water which is not subjected to heating flows into heat exchanger 19 via tap water supply pipe 23 to be heated by exchanging the heat with the heating water, and is then supplied to the user via hot-water supply pipe 24. At this time, flow switch 25 senses the flow of the tap water and provides a controller with a sensing signal which indicates that the hot water is being utilizing.

In a hot-water mode as described above, the revolution direction of a bi-directional pump 18 is in opposition to that found in a heating mode, and the heating water which flows out from heat exchanger 19 does not circulate through the pipe laying of each of the rooms via heating water supply pipe 20 but rather, the direction of the water flow is changed by bi-directional pump 18 to flow into heat exchanger 19 via a roundabout pipe 26.

Consequently, the heating water in heat exchanger 19 maintains a high temperature and heat exchanger 19 efficiently heats the water.

FIG. 2 is a circuit diagram for illustrating a driving of the bi-directional pump shown in FIG. 1. As illustrated in FIG. 2, bi-directional pump 18 is controlled by a first relay RL1 and a second relay RL2. In order for bi-directional pump 18 to operate in the heating mode, after first relay RL1 turns off, second relay RL2 is switched over to the heating mode and first relay RL1, successively, turns on. In order that bi-directional pump 18 operates in the hot-water mode, after first relay RL1 turns off, second relay RL2 is switched over to the hot-water mode and first relay RL1 returns to the turn-on state.

A description of a structure and an operation of bi-directional pump 18 follows.

FIG. 3 is a lateral cross-sectional view for showing a structure of the bi-directional pump shown in FIG. 1. FIG. 4 is a front cross-sectional view for showing the structure of the bi-directional pump shown in FIG. 1. As shown in FIGS. 3 and 4, bi-directional pump 18 includes a casing 41, an impeller 42, a bi-directional pump electromotor 43, first and second sleeves 44 and 45, first and second switching holes 46 and 47, a ball installation room 48, a switching ball 49, first and second paths 50 and 51.

Casing 41 includes an inflow opening 18A, first and second outflow openings 18B and 18C.

Inflow opening 18A is formed at a central portion in the direction of an axis line, and first and second outflow openings 18B and 18C are formed on opposite sides in the direction of an axis line at right angles to the axis.

Impeller 42 is installed inside of casing 41. Bi-directional pump electromotor 43 gives a turn to impeller 42 in a positive or a reverse direction, and first and second paths 50 and 51 are formed on both sides of first and second outflow openings 18B and 18C, respectively. First and second sleeves 44 and 45 are respectively inserted into both sides of first and second outflow openings 18B and 18C, and include first and second switching holes 46 and 47, respectively.

Switching ball 49 is disposed in ball installation room 48 which is disposed between first and second sleeves 44 and 45, and closes either first switching hole 46 or second switching hole 47 depending on whether it is in the heating or hot-water mode.

Bi-directional pump 18 is so installed inside of the gas boiler, as shown in FIG. 1, that first outflow opening 18B is disposed at a lower portion thereof and that second outflow opening 18C is disposed at an upper portion thereof. Bi-directional pump 18 operates as follows depending on the operating mode.

During the heating mode of the gas boiler, as shown in FIG. 4, bi-directional pump electromotor 43 gives a turn clockwise to impeller 42. When impeller 42 rotates clockwise, the pressure of the water which flows into ball installation room 48 via first path 50 is higher than that of the water which flows into ball installation room 48 via second path 51, so that switching ball 49 moves to the direction of first switching hole 46 and closes first switching hole 46 while opening second switching hole 47 disposed on the opposite side. Consequently, in the heating mode, the heating water flows from heat exchanger 19 into bi-directional pump 18 via inflow opening 18A, and then flows from second outflow opening 18B into heating water supply pipe 20.

During the hot-water mode of the gas boiler, as shown in FIG. 3, bi-directional pump electromotor 43 gives a turn counterclockwise to impeller 42. When impeller 42 rotates counterclockwise, the pressure of the water which flows into ball installation room 48 via second path 51 is higher than that of the water which flows into ball installation room 48 via first path 50, so that switching ball 49 moves to the direction of second switching hole 47 and closes second switching hole 47 while opening first switching hole 46 disposed on the opposite side. Consequently, in the hot-water mode, the heating water flows from heat exchanger 19 into bi-directional pump 18 via inflow opening 18A, and then flows from first outflow opening 18C into roundabout pipe 26.

As described above, during the warm-water mode, bi-directional pump 18 has the revolution direction thereof which is in opposition to that found in the heating mode, and switching ball 49 moves according to the revolution direction of bi-directional pump 18 to change the outflow direction of the heating water.

However, when the user selects and switches over from one mode to the other while the gas boiler is operating, switching ball 49 disposed inside of bi-directional pump 18 to adjust the flow of the heated water, abruptly moves from one side to the other side to collide with first switching hole 46 or with second switching hole 47, and thereby frequently generating a shock noise.

SUMMARY OF THE INVENTION

Therefore, it is an object of the present invention to provide a method by which a shock noise, generated when a bi-directional pump of a gas boiler switches from a rest or hot-water mode to a heating mode or from the heating mode to the hot-water mode, is not produced to enable the gas boiler to operate in quiet.

It is another object of the present invention to provide an apparatus by which a shock noise, generated when a bi-directional pump of a gas boiler switches from a rest or hot-water mode to a heating mode or from the heating mode to the hot-water mode, is not produced to enable the gas boiler to operate in quiet.

In order to achieve the first object, the present invention provides a method for controlling a bi-directional pump of a gas boiler, which comprises the steps of:

(i) cutting off an electric power supplied to a bi-directional pump electromotor when a hot-water mode is selected while the gas boiler operates in a rest or heating mode;

(ii) switching over from a standby terminal or a positive revolution switching terminal of the bi-directional pump electromotor to a reverse revolution switching terminal;

(iii) starting the bi-directional pump electromotor softly and performing a hot-water mode;

(iv) stopping the bi-directional pump electromotor softly when the heating mode is selected while the gas boiler operates in the hot-water mode;

(v) switching over to the positive revolution switching terminal of the bi-directional pump electromotor; and (vi) supplying an electric power to the bi-directional pump electromotor and performing the heating mode.

In order to achieve the second object, the present invention provides an apparatus for controlling a bi-directional pump of a gas boiler, which comprises:

means for driving a bi-directional pump for bi-directionally controlling a flow of heating water based on the selection of a heating mode or of a hot-water mode;

switching means for selecting a positive or a reverse revolution of the bi-directional pump electromotor;

means for controlling an electric power supplied to the bi-directional pump driving means via the switching means; and control means for cutting off the electric power supplied to the bi-directional pump driving means via the electric power control means when a rest or a hot-water mode is selected while performing the heating mode operation, for controlling the switching means to be switched over to a reverse revolution switching terminal of the bi-directional pump driving means, for driving the bi-directional pump driving means in a reverse direction to perform the hot-water mode while increasing the electric power supplied to the bi-directional pump driving means by degrees for a first predetermined time interval via the electric power control means, for decreasing the electric power supplied to the bi-directional pump driving means via the electric power control means by degrees for a second predetermined time interval to cut off the supplied electric power when the heating mode is selected while performing the hot-water mode operation, for controlling the switching means to be switched over to a positive revolution switching terminal of the bi-directional pump driving means, and for supplying the electric power to the bi-directional pump driving means via the electric power control means.

In a method and an apparatus for reducing the generation of a shock noise generated while a gas boiler adopting a bi-directional pump is operating according to the present invention, a velocity of a switching ball of the bi-directional pump at which the switching ball moves upwardly or downwardly, is decreased to reduce the generation of a water noise, and thereby enabling the gas boiler to operate in quiet.

BRIEF DESCRIPTION OF THE DRAWINGS

The above objects and other advantages of the present invention will become more apparent by describing in detail a preferred embodiment thereof with reference to the attached drawings, in which:

FIG. 7 is a timing chart for showing a magnitude of the electric power which is supplied to the bi-directional pump electromotor during a switching between operating modes of the gas boiler;

FIG. 8 is a timing chart for showing a magnitude of voltage which is applied to the bi-directional pump electromotor during a switch between operating modes of the gas boiler;

FIG. 9 is a timing chart for showing a pulse waveform which is outputted from a control section in order to generate the waveform shown in FIG. 8;

FIG. 10 is a timing chart for showing a magnitude of voltage which is applied to the bi-directional pump electromotor while changing a resistance value of a light triac to a plurality of steps during a switch between operating modes of the gas boiler; and FIG. 11 is a timing chart for showing a pulse width modulation waveform which is outputted from the control section in order to generate the waveform shown in FIG. 10.

DESCRIPTION OF THE EMBODIMENT

A description will be given below in detail with reference to accompanying drawings to a configuration and an operation of a method and an apparatus for controlling a bi-directional pump of a gas boiler according to an embodiment of the present invention.

Figure 1:
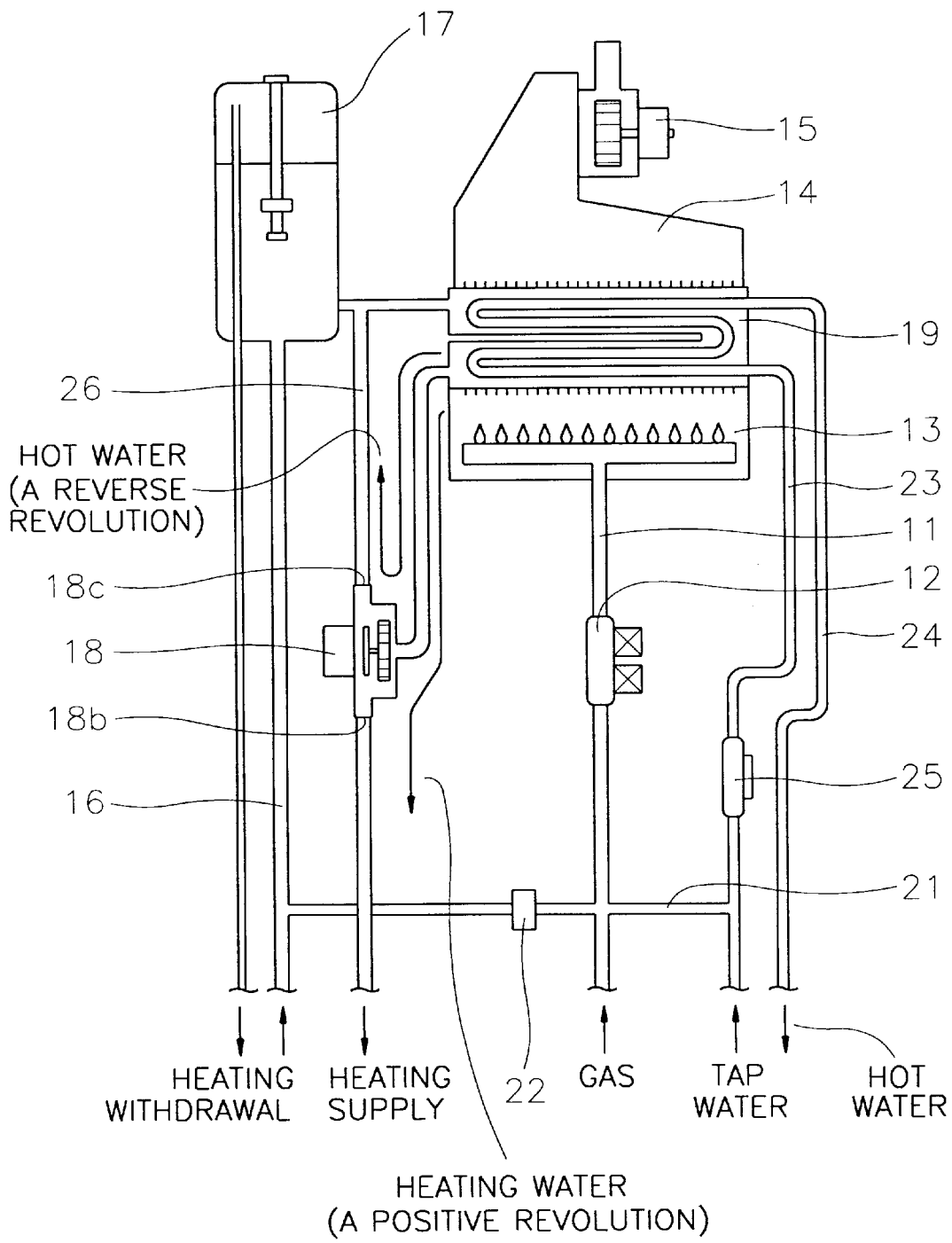
FIG. 1 is a configuration diagram for showing a schematic configuration of a conventional gas boiler which adopts a bi-directional pump.
Figure 2:
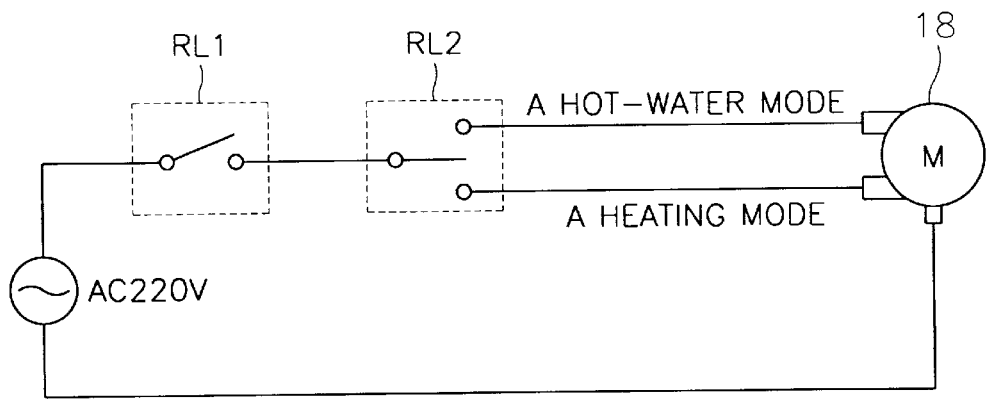
FIG. 2 is a circuit diagram for illustrating a driving of the bi-directional pump shown in FIG. 1.
Figure 3:
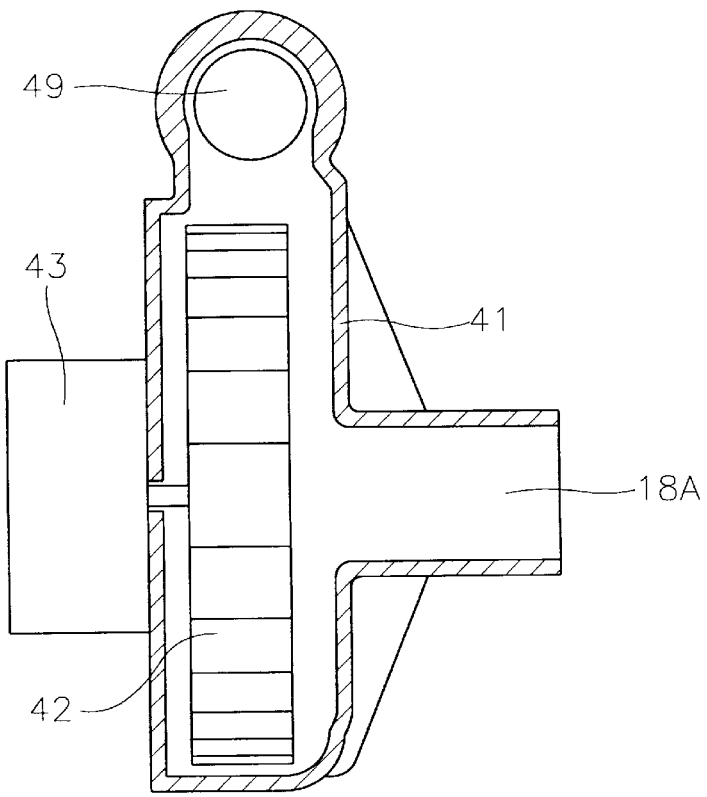
FIG. 3 is a lateral cross-sectional view for showing a structure of the bi-directional pump shown in FIG. 1.
Figure 4:
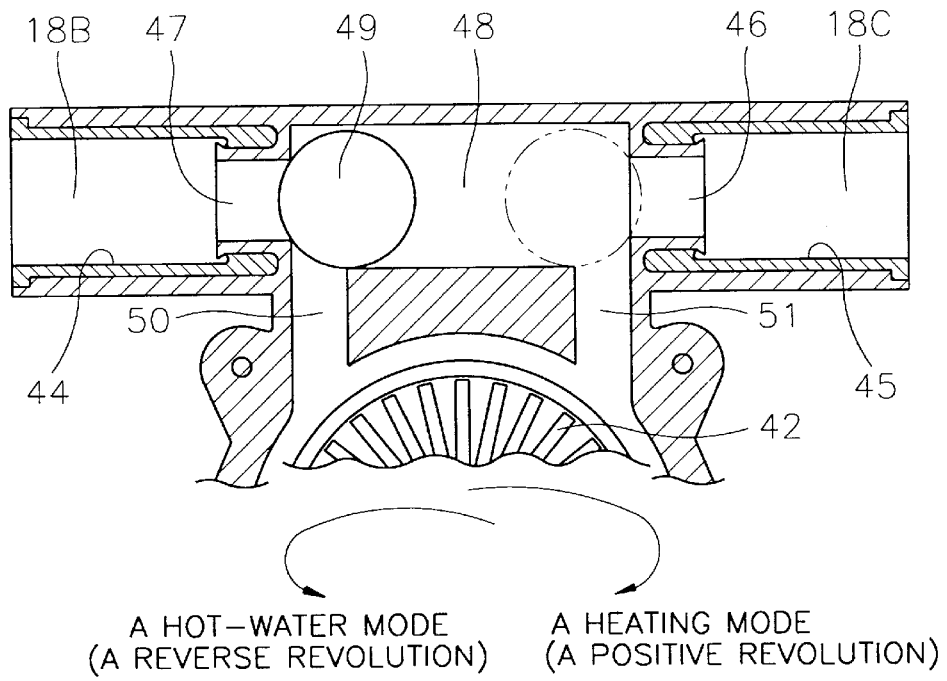
FIG. 4 is a front cross-sectional view for showing the structure of the bi-directional pump shown in FIG. 1.
Figure 5:
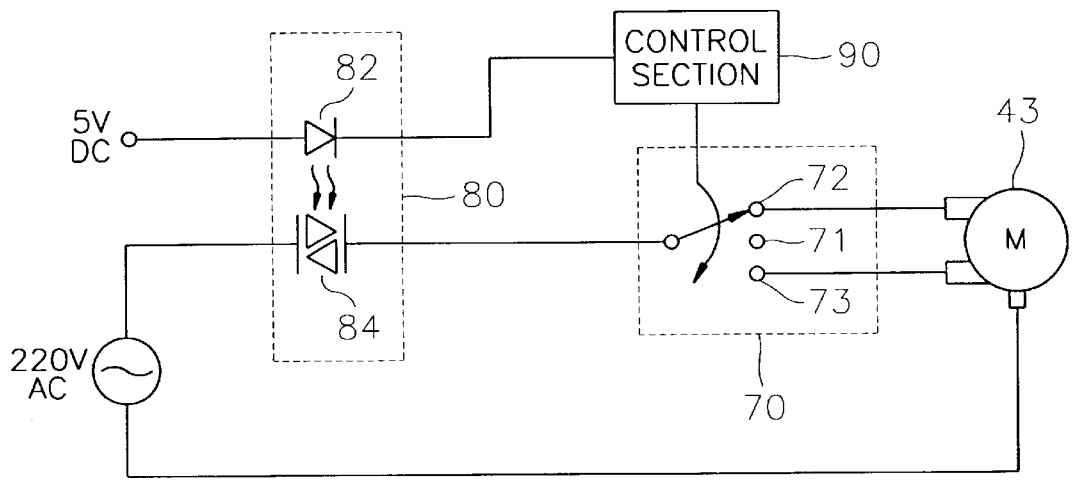
FIG. 5 is a block diagram for showing a configuration of a driving circuit of the bi-directional pump of the gas boiler according to an embodiment of the present invention.

FIG. 5 is a block diagram for showing a configuration of a driving circuit of the bi-directional pump of the gas boiler according to an embodiment of the present invention.

As shown in FIG. 5, a driving circuit which performs a method for controlling bi-directional pump according to the present invention, includes a bi-directional pump electromotor 43, a switching section 70, an electric power control section 80 and a control section 90.

Bi-directional pump electromotor 43 drives a bi-directional pump which bi-directionally controls a flow of heating water based on the selection of a heating mode or of a hot-water mode.

Switching section 70 includes a standby terminal 71, an electromotor positive-revolution switching terminal 72 and an electromotor reverse-revolution switching terminal 73, and selects a positive or a reverse revolution of bi-directional pump electromotor 43.

Electric power control section 80 controls via switching section 70 an electric power which is supplied to bi-directional pump electromotor 43.

Preferably, electric power control section 80 is a photo-triac which is a current control device which consists of a light emitting diode 82 and a triac 84 for receiving light from light emitting diode 82.

While light emitting diode 82 is emitting the light in response to a control signal which is provided by control section 90, triac 84 receives the light from light emitting diode 82 and is subjected to the variation of its resistance value. Then, a current which is supplied to bi-directional pump electromotor 43 via triac 84 is adjusted, and thereby changes the electric power.

When a rest mode or the hot-water mode is selected while the gas boiler operates in the heating mode, control section 90 cuts off the electric power which is supplied to bi-directional pump electromotor 43 via electric power control section 80, and controls switching section 70 to be switched over from standby terminal 71 or from positive revolution switching terminal 72 to reverse revolution switching terminal 73 of bi-directional pump electromotor 43. After that, while increasing the electric power which is supplied to bi-directional pump electromotor 43 by degrees for five seconds via electric power control section 80, control section 90 drives bi-directional pump electromotor 43 in a reverse direction and operates the hot-water mode.

When the heating mode is selected while the gas boiler operates in the hot-water mode, control section 90 decreases the electric power which is supplied to bi-directional pump electromotor 43 via electric power control section 80 by degrees for one to two seconds to cut off the supplied electric power, and controls switching section 70 to be switched over from reverse revolution switching terminal 73 to positive revolution switching terminal 72. After that, control section 90 supplies the electric power to bi-directional pump electromotor 43 via electric power control section 80.

Figure 6:
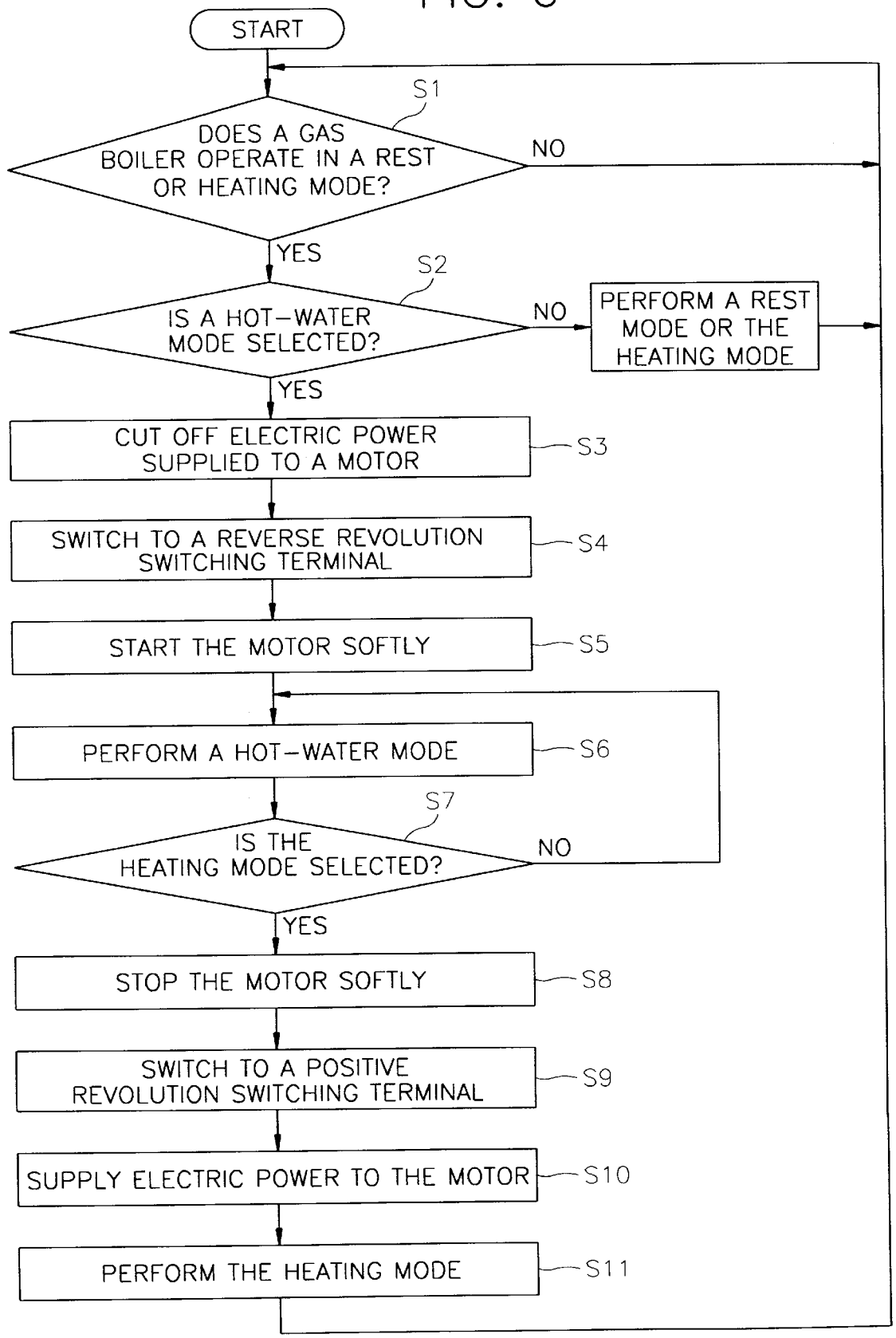
FIG. 6 is a flowchart for illustrating a control method of the bi-directional pump according to an embodiment of the present invention.

Hereinafter, a description of an operation of the apparatus which controls the bi-directional pump by means of electric power control section 80 including the light triac will be provided as follows. Also, a description will then be made of the procedure of a control method which is executed by the apparatus shown in FIG. 5, in accordance with the flowchart of FIG. 6. FIG. 6 is a flowchart for illustrating a control method of the bi-directional pump according to an embodiment of the present invention.

Control section 90 checks whether or not the gas boiler operates in the rest mode or in the heating mode (step S1). When receiving a hot-water mode selection signal (step S2), control section 90 provides electric power control section 80 with a first control signal which is an electromotor power cut-off signal, and cuts off the electric power which is supplied to bi-directional pump electromotor 83 (step S3).

After that, control section 90 provides switching section 70 with a second control signal which is a mode terminal switching signal, and controls switching section 70 to be switched over to reverse revolution switching terminal 73 of bi-directional pump electromotor 43 which is a terminal for initiating the hot-water mode (step S4).

In step S5, control section 90 provides electric power control section 80 with a third control signal which is a soft-start signal for bi-directional pump electromotor 43, and softly starts bi-directional pump electromotor 43. In step S6, control section 90 gives a turn to bi-directional pump electromotor 43 in a reverse direction, and operates the gas boiler in the hot-water mode.

Afterwards, when receiving a heating mode selection signal (step S7), control section 90 provides electric power control section 80 with a fourth control signal which is a soft-stop signal for bi-directional pump electromotor 43, and softly stops bi-directional pump electromotor 43 (step S8).

In step S9, control section 90 provides the second signal to switching section 70, and controls switching section 70 to be switched over to positive revolution switching terminal 72 of bi-directional pump electromotor 43 which is a terminal for initiating the heating mode.

Thereafter, when control section 90 provides electric power control section 80 with a fifth control signal which is a signal for supplying the electric power to bi-directional pump electromotor 43, control section 90 gives a turn to bi-directional pump electromotor 43 in a positive direction, and operates the gas boiler in the heating mode (step S11).

The operation of the gas boiler in each of the operating modes is described in association with waveform diagrams.

FIG. 7 is a timing chart for showing a magnitude of the electric power which is supplied to the bi-directional pump electromotor during a switching between operating modes of the gas boiler. As shown in FIG. 7, when receiving the hot-water mode selection signal while bi-directional pump electromotor 43 positively rotates, control section 90 cuts off the electric power which is supplied to bi-directional pump electromotor 43 at a point in time A, and motor reverse revolution switching terminal 73 is selected. Afterwards, at a point in time C, bi-directional pump electromotor 43 is softly started for about five seconds, and the hot-water mode operation is performed.

Also, when the heating mode selection signal is received by control section 90 during the hot-water mode operation, the electric power which is supplied to bi-directional pump electromotor 43 is decreased at a point in time D by degrees for about one to two seconds, and the soft-stop is performed. After motor positive revolution switching terminal 72 is selected for a time interval E, the electric power is supplied to bi-directional pump electromotor 43, and bi-directional pump electromotor 43 positively rotates at a point in time F. Then, the heating mode operation is performed.

FIG. 8 is a timing chart for showing a magnitude of voltage which is applied to the bi-directional pump electromotor during a switch between operating modes of the gas boiler. FIG. 9 is a timing chart for showing a pulse waveform which is outputted from a control section in order to generate the waveform shown in FIG. 8.

In order for the operating mode of the gas boiler to be switched over from the rest or the hot-water mode to the heating mode, in the first place, electric power control section 80 must be turned off. In this case, switching ball 49 of bi-directional pump 18 is placed at first switching hole 46 which is disposed at a lower portion of ball installation room 48, and switching ball 49 does not move. In a state wherein electric power control section 80 turns off, control section 90 controls switching section 70 to be switched over to the heating mode terminal.

Thereafter, electric power control section 80 so turns on that a voltage which is applied to bi-directional pump electromotor 43 increases according to a plurality of steps while a resistance value of triac 84 of electric power control section 80 varies according to a plurality of steps. Then, in order to vary the resistance value of triac 84 according to the plurality of steps, as shown in FIG. 9, control section 90 provides a high-level signal of five volts, e.g., a train of pulses each of which has an equal duty cycle of 50%, and provides a low-level signal having zero volts after a predetermined time interval.

When control section 90 continuously provides the high-level signal, because light triac 84 of electric power control section 80 turns off and an electric current does not flow through light triac 84, a voltage is not applied to bi-directional pump 43. When control section 90 provides a train of pulses each of which has an equal duty cycle, the resistance value of light triac 84 increases, and half of the total voltage which is supplied to bi-directional pump electromotor 43 is applied to bi-directional pump electromotor 43. A time interval for which approximately half of the total voltage is applied to bi-directional pump electromotor 43, is approximately one to two seconds. Afterwards, when control section 90 provides the low-level signal having zero volts, light triac 84 turns on, and the total voltage of a power supply, i.e., an approximate 220 volts, is applied to bi-directional pump electromotor 43.

According to the above method, a voltage is not applied wholly but is applied to bi-directional pump electromotor 43 in two stages.

In order for the operating mode of the gas boiler to be switched over from the heating mode to the hot-water mode, in the first place, electric power control section 80 must be turned off. Namely, electric power control section 80 so gradually turns off that a voltage which is applied to bi-directional pump electromotor 43 gradually decreases. At this time, while a resistance value of light triac 84 of electric power control section 80 increases by degrees, the voltage applied to bi-directional pump electromotor 43 decreases by degrees.

As shown in FIG. 9, when the hot-water mode is selected while control section 90 provides the low-level signal of zero volts in order to increase the resistance value of light triac 84 of electric power control section 80, control section 90 provides a train of pulses each of which has the equal duty cycle of 50%, and continuously provides the high-level signal of five volts after a predetermined time interval. When control section 90 continuously provides the high-level signal of five volts, because light triac 84 of electric power control section 80 turns off and an electric current does not flow through light triac 84, a voltage is not applied to bi-directional pump 43. When control section 90 provides a train of pulses each of which has an equal duty cycle, the resistance value of light triac 84 decreases, and a half of a total voltage which is supplied to bi-directional pump electromotor 43, is applied to bi-directional pump electromotor 43. Then, a time interval for which the half of the total voltage is applied to bi-directional pump electromotor 43, is approximately five seconds.

Thereafter, when control section 90 provides the high-level signal having five volts to electric power control section 80, light triac 84 turns off and the total voltage of a power supply, i.e., an approximate 220 volts, is applied to bi-directional pump electromotor 43.

In an embodiment as described above, control section 90 provides a voltage in two stages to bi-directional pump electromotor 43 by using the train of pulses having the duty cycle of 50%. Meanwhile, in order to apply a voltage to bi-directional pump electromotor 43 in three stages, control section 90 so sets a duty cycle that a width of a high-level signal of a train of pulses having the same frequency is widened for the first half of 1 [sec] while a width of low-level signal thereof is narrowed and that a width of a high-level signal thereof is narrowed for the second half of 1 [sec] while a width of low-level signal thereof is widened. Then, the voltage which is applied to bi-directional pump electromotor 43 increases in three stages.

FIG. 10 is a timing chart for showing a magnitude of voltage which is applied to the bi-directional pump electromotor while changing a resistance value of a light triac to a plurality of steps during a switch between operating modes of the gas boiler. FIG. 11 is a timing chart for showing a pulse width modulation waveform which is outputted from the control section in order to generate the waveform shown in FIG. 10.

As shown in FIG. 11, when the rest or hot-water mode is switched to the heating mode, control section 90 provides electric power control section 80 with a train of pulse width modulation pulses having a duty factor which is gradually reduced. When the heating mode is switched over to the hot-water mode, control section 90 provides electric power control section 80 with a train of pulse width modulation pulses having a duty factor which is gradually increased.

As shown in FIGS. 10 and 11, in order to switch over from the rest or hot-water mode to the heating mode, control section 90 provides electric power control section 80 with a train of pulse width modulation pulses having the duty factor which is gradually reduced, and the mode switching is performed gently. Also, when the heating mode is switched over to the hot-water mode, control section 90 provides electric power control section 80 with a train of pulse width modulation pulses having the duty factor which is gradually increased, and the mode switching is performed gently.

In the method and the apparatus for controlling a bi-directional pump of a gas boiler, when the heating mode is switched to the hot-water mode, because the electric power which is supplied to the bi-directional pump electromotor is not cut off in an instant but is slowly reduced, the switching ball which is disposed inside of the bi-directional pump does not abruptly move from a direction of an upper portion of the ball installation room, i.e., the switching hole, to a direction of the switching hole disposed at an lower portion thereof, but stops at a central portion thereof for a time. Afterwards, the switching ball moves to the direction of the lower switching hole.

Consequently, when the hot-water mode is selected, in the case where the switching ball of the bi-directional pump which is placed at the upper switching hole moves to the direction of the lower switching hole, the switching ball does not close the switching hole in an instant to prevent the flow of water from being abruptly varied, and therefore the shock noise is not generated.

As described above, after the electric power control section turns off and the hot-water mode terminal is selected in the switching section, when the electric power control section is required to return to a turn-on state thereof, the switching ball of the bi-directional pump is already moved to the lower portion of the ball installation room due to its weight, and the switching ball no longer moves. As a result, although the electric power control section turns abruptly on, the shock noise is not generated.

Additionally, when the rest or hot-water mode is switched over to the heating mode, because a voltage is not applied to the bi-directional pump electromotor in an instant but is applied thereto in a state wherein the applied voltage is divided into more than two stages, the switching ball which is disposed inside of the bi-directional pump does not abruptly move from the direction of the lower portion of the ball installation room, i.e., the switching hole, to the direction of the switching hole disposed at the upper portion thereof, but stops at the central portion thereof for a time. Afterwards, the switching ball moves to the direction of the upper switching hole.

Consequently, when the heating mode is selected, in the case where the switching ball of the bi-directional pump which is placed at the lower switching hole moves to the direction of the upper switching hole, the switching ball does not close the switching hole in an instant to prevent the flow of water from being abruptly varied, and therefore the shock noise is not generated.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. An apparatus for controlling a bi-directional pump of a gas boiler, said apparatus comprising:

means for driving a bi-directional pump for bi-directionally controlling a flow of heating water based on the selection of a heating mode or of a hot-water mode;

switching means for selecting a positive or a reverse revolution of said bi-directional pump electromotor;

means for controlling an electric power supplied to said bi-directional pump driving means via said switching means; and control means for cutting off the electric power supplied to said bi-directional pump driving means via said electric power control means when a rest or a hot-water mode is selected while performing the heating mode operation, for controlling said switching means to be switched over to a reverse revolution switching terminal of said bi-directional pump driving means, for driving said bi-directional pump driving means in a reverse direction to perform the hot-water mode while increasing the electric power supplied to said bi-directional pump driving means by degrees for a first predetermined time interval via said electric power control means, for decreasing the electric power supplied to said bi-directional pump driving means via said electric power control means by degrees for a second predetermined time interval to cut off the supplied electric power when the heating mode is selected while performing the hot-water mode operation, for controlling said switching means to be switched over to a positive revolution switching terminal of said bi-directional pump driving means, and for supplying the electric power to said bi-directional pump driving means via said electric power control means.

2. The apparatus for controlling a bi-directional pump of a gas boiler as claimed in claim 1, wherein said first predetermined time interval is 5 seconds.

3. The apparatus for controlling a bi-directional pump of a gas boiler as claimed in claim 1, wherein said second predetermined time interval is 1 to 2 seconds.

4. The apparatus for controlling a bi-directional pump of a gas boiler as claimed in claim 1, wherein said increase or decrease control of the electric power supplied to said bi-directional pump driving means is performed in a pulse width modulation system.

5. The apparatus for controlling a bi-directional pump of a gas boiler as claimed in claim 1, wherein said electric power control means adjusts the electric power by emitting and receiving light.

* * * * *